United States Patent
Asprey et al.

(10) Patent No.: US 11,083,073 B1
(45) Date of Patent: Aug. 3, 2021

(54) WIRELESS COMMUNICATION CONTROL IN LIGHTING SYSTEMS

(71) Applicant: TrueLight, Inc., Kent, WA (US)

(72) Inventors: David Asprey, Cobble Hill (CA); Timothy K. Brodesser, Auburn, WA (US)

(73) Assignee: TRUELIGHT, INC., Kent, WA (US)

( * ) Notice: Subject to any disclaimer, the term of this patent is extended or adjusted under 35 U.S.C. 154(b) by 0 days.

(21) Appl. No.: 17/152,472

(22) Filed: Jan. 19, 2021

(51) Int. Cl.
*H05B 47/10* (2020.01)
*H05B 47/19* (2020.01)
*H05B 45/30* (2020.01)
*H04W 4/20* (2018.01)

(52) U.S. Cl.
CPC .............. *H05B 47/19* (2020.01); *H04W 4/20* (2013.01); *H05B 45/30* (2020.01)

(58) Field of Classification Search
CPC ........ H05B 45/10; H05B 45/30; H05B 47/10; H05B 47/105; H05B 47/16; H05B 47/17; H05B 47/175; H05B 47/19; H05B 47/195
See application file for complete search history.

(56) References Cited

U.S. PATENT DOCUMENTS

| | | | |
|---|---|---|---|
| 6,528,954 B1 | 3/2003 | Lys et al. | |
| 9,066,393 B2 * | 6/2015 | Recker | H05B 45/37 |
| 10,932,349 B1 * | 2/2021 | Westrick, Jr. | H05B 47/11 |
| 2002/0118538 A1 | 8/2002 | Calon et al. | |
| 2004/0156194 A1 | 8/2004 | Petzl et al. | |
| 2006/0250792 A1 | 11/2006 | Izardel | |
| 2010/0013414 A1 | 1/2010 | Johnson, III et al. | |
| 2012/0098655 A1 | 4/2012 | Preta et al. | |
| 2016/0037614 A1 * | 2/2016 | Setomoto | H05B 47/19 315/294 |
| 2017/0034893 A1 * | 2/2017 | Chen | H05B 47/105 |
| 2017/0202069 A1 * | 7/2017 | Hidaka | H05B 45/24 |
| 2018/0023785 A1 | 1/2018 | Chien | |
| 2018/0235059 A1 * | 8/2018 | Kurihara | H05B 47/105 |
| 2019/0028195 A1 | 1/2019 | Tran | |

OTHER PUBLICATIONS

Hyperikon A19 LED Light Bulbs, Amazon.com, https://www.amazon.com/Hyperikon-Adjustable-Changing-Equivalent-Temperature/dp/B07DP7LB63, date accessed Jan. 14, 2021, in 10 pages.

\* cited by examiner

*Primary Examiner* — Thai Pham
(74) *Attorney, Agent, or Firm* — Knobbe, Martens, Olson & Bear, LLP

(57) ABSTRACT

A lighting apparatus can include a light source, a communication circuit, and a controller. The light source can emit visible light and be powered by a power signal. The communication circuit can wirelessly communicate with an electronic device and be in a first mode in which wireless communication by the communication circuit is enabled and a second mode in which wireless communication by the communication circuit is disabled. The controller can: activate and deactivate the light source; detect a set change in the power signal over a period of time when the communication circuit is in the second mode; and responsive to detecting the set change, cause the communication circuit to transition from being in the second mode to being in the first mode.

20 Claims, 3 Drawing Sheets

WIRELESS COMMUNICATION CONTROL IN LIGHTING SYSTEMS

BACKGROUND

The present application relates to control of features of a lighting apparatus, such as a smart light bulb.

SUMMARY

A lighting apparatus is disclosed in one embodiment. The lighting apparatus can include an input port, a light source, a communication circuit, a controller, and a housing. The input port can receive a power signal that supplies power when the power signal is at a first level and does not supply power when the power signal is at a second level different from the first level. The light source can emit visible light and be powered by the power signal when the power signal is at the first level. The communication circuit can wirelessly communicate with an electronic device, and be in a first mode in which wireless communication by the communication circuit is enabled and a second mode in which wireless communication by the communication circuit is disabled. The controller can: activate the light source; deactivate the light source; detect a set change in the power signal over a period of time when the communication circuit is in the second mode, the set change in the power signal comprising the power signal changing from being at the first level to being at the second level; and responsive to detecting the set change in the power signal over the period of time when the communication circuit is in the second mode, cause the communication circuit to transition from being in the second mode to being in the first mode. The housing can support the input port, the light source, the communication circuit, and the controller.

The lighting apparatus of the preceding paragraph can include one or more of the following features: The set change in the power signal can include the power signal changing n times (i) from being at the first level to being at the second level and back to being at the first level or (ii) from being at the second level to being at the first level and back to being at the second level, and n can be two or more. The period of time can be 10 seconds or less. n can be five. The input port can include a screw-type socket. The communication circuit and the controller can be powered by the power signal when the power signal is at the first level. The communication circuit can wirelessly receive an instruction from the electronic device, and the instruction can indicate to activate or deactivate the light source at a future time. The controller can activate or deactivate the light source at the future time according to the instruction. The future time can be at least 1 minute later than a time when the communication circuit receives the instruction from the electronic device. The lighting apparatus can be in combination with the electronic device, and the electronic device can execute a program to allow a user to wirelessly communicate the instruction from the electronic device to the communication circuit. The communication circuit can wirelessly communicate with the electronic device according to a packet-based protocol or a network protocol. The communication circuit can wirelessly communicate with the electronic device via electromagnetic radiation that has a frequency of more than 2 GHz and less than 10 GHz. The controller may cause the communication circuit to transition from being in the second mode to being in the first mode responsive to no events other than detecting the set change in the power signal over the period of time when the communication circuit is in the second mode. The controller can cause the communication circuit to transition from being in the first mode to being in the second mode responsive to the communication circuit being in the first mode for a set time period. The controller can cause the communication circuit to transition from being in the first mode to being in the second mode responsive to expiration of a set time period after receiving a previous communication from the electronic device. The set time period can be between 10 seconds and 2 minutes. The controller can, responsive to detecting the set change in the power signal over the period of time when the communication circuit is in the second mode, change a property of the visible light emitted by the light source for less than a set time period to indicate that the communication circuit transitioned from being in the second mode to being in the first mode, and the set time period can be 5 seconds. The controller can: detect that the power signal changed from being at the second level to being at the first level; and responsive to detecting that the power signal changed from being at the second level to being at the first level, activate the light source. The light source can include multiple light emitting diodes. The lighting apparatus can include a driver circuit configured to supply a current to the plurality of light emitting diodes, and the controller can cause the driver circuit to supply the current to activate the plurality of light emitting diodes and cause the driver circuit to not supply the current to deactivate the plurality of light emitting diodes. The lighting apparatus can be in combination with a user input element, and the user input element can switch the power signal (i) from being at the first level to being at the second level responsive to a first user input to the user input element and (ii) from being at the second level to being at the first level responsive to a second user input to the user input element.

Disclosed also is a method of operating or making the lighting apparatus of any of the preceding two paragraphs.

DETAILED DESCRIPTION

Figure 1:
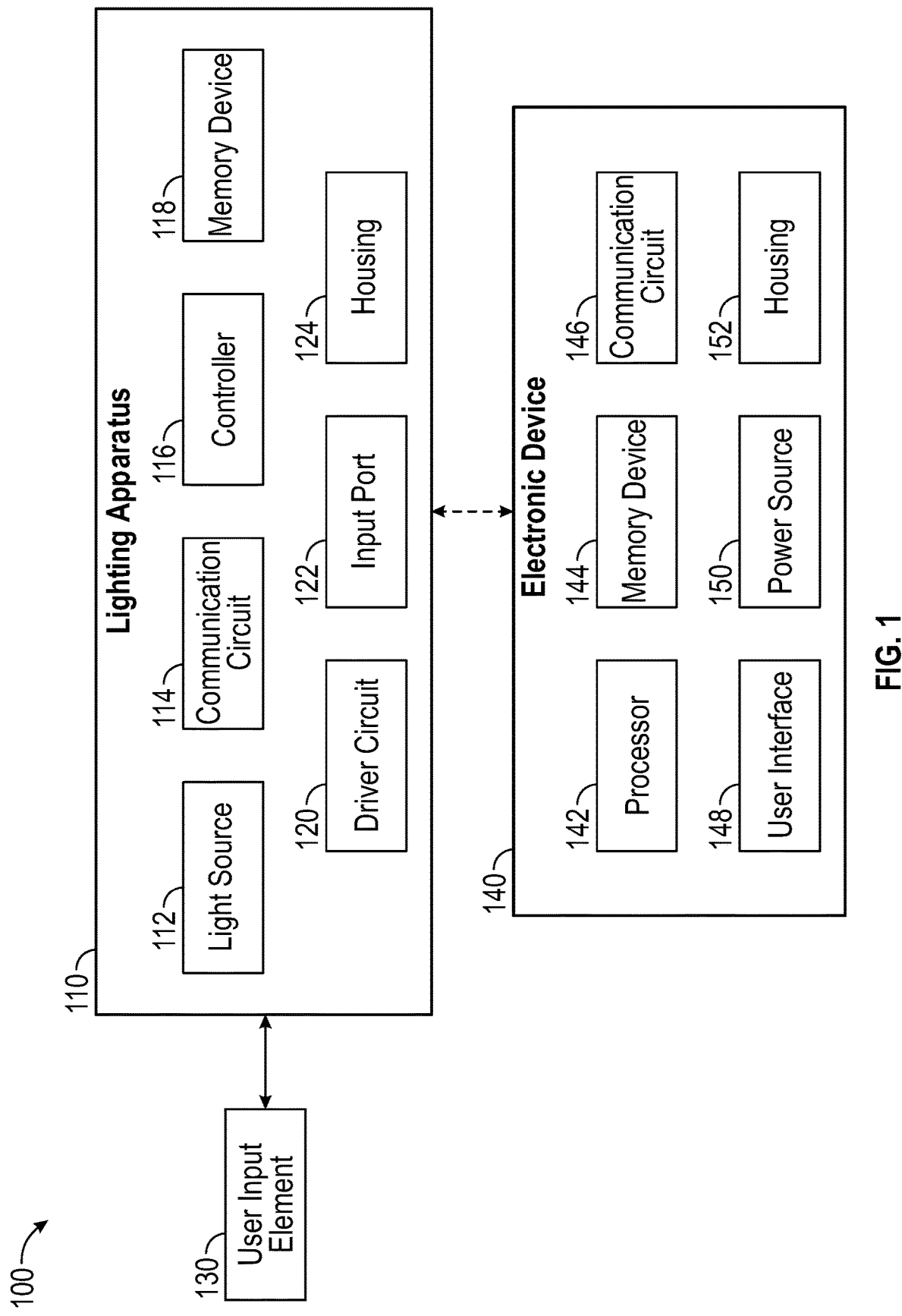
FIG. 1 illustrates a lighting control system including a lighting apparatus.

Exposure to electromagnetic radiation can have adverse health consequences for individuals. Electromagnetic radiation, however, may be used to provide desirable feature enhancements in systems, such as to facilitate wireless communication between devices. As a result, the use of electromagnetic radiation in systems may be controlled to reduce the amount or frequency of use of electromagnetic radiation to limit exposure by neighboring individuals to electromagnetic radiation. This approach can allow for the use of electromagnetic radiation to provide feature enhancements while diminishing the risk of adverse health consequences.

This disclosure describes at least a lighting apparatus which can selectively enable or disable its ability to wirelessly communicate with one or more electronic devices. The lighting apparatus can enable or disable its wireless communications responsive to user inputs that also may be used to control whether the lighting apparatus is powered or whether a light source of the lighting apparatus is activated. In one example, the lighting apparatus can be a smart light bulb with a communication circuit that may wirelessly communicate via a Bluetooth™ protocol or a Wi-Fi™ protocol. The lighting apparatus can activate its light source upon receipt of a first user input indicating that a user toggled a light switch, and the lighting apparatus can deactivate its light source upon receipt of a second user input indicating that the user toggled the light switch. In addition, the lighting apparatus can enable its communication circuit to wirelessly communicate responsive to a set user input indicating that the user toggled the light switch a particular number of times over a particular period of time. Upon expiration of a period of time while the lighting apparatus enabled its communication circuit to wirelessly communicate, the lighting apparatus can disable its communication circuit from wirelessly communicating. One or more parts of this disclosure can accordingly address concerns about the adverse health consequences for individuals from exposure to electromagnetic radiation, without utilizing a separate low voltage power supply to power a controller of the lighting apparatus.

One or more aspects described herein may be counterintuitive at least because a light switch used by a user to control light emitted by a lighting apparatus for illumination of an area for an individual (for example, an activation or deactivation of its light source or an adjustment of a color of its light source) can also be used by the user to control a feature of the lighting apparatus other than the light emitted by the lighting apparatus for illumination of the area (for example, an enablement or disablement of wireless communications by the lighting apparatus). This may allow the feature of the lighting apparatus other than the light emitted for illumination of the area to be controlled without changing an external structure of the lighting apparatus, such as by adding a button to a housing of the lighting apparatus to control the feature of the lighting apparatus other than the light emitted for illumination of the area. Such a lighting apparatus may thus function smoothly and easily with existing lighting infrastructure (for example, may be installed in a lamp socket and controlled with a light switch) and yet allow for user control of the feature of the lighting apparatus other than the light emitted for illumination of the area. Moreover, this desirably can permit a user to control the feature of the lighting apparatus other than the light emitted for illumination of the area without physically accessing the lighting apparatus, which may be installed in a location that may be unsafe, difficult, or time-consuming to access. In addition, this can allow a user to control via one communication channel (for example, via wired communication) activation of the feature of the lighting apparatus other than the light emitted for illumination of the area, without requiring communication with the lighting apparatus via a different communication channel (for example, via wireless communication) which may be unavailable until after activation of the feature of the lighting apparatus other than the light emitted for illumination of the area.

FIG. 1 illustrates a lighting control system 100 that includes a lighting apparatus 110, a user input element 130, and an electronic device 140. The user input element 130 can be used by a user to control powering of the lighting apparatus 110, as well as activation or deactivation of the light source 112 of the lighting apparatus 110. The electronic device 140 can be used by the user to wirelessly communicate with the lighting apparatus 110 and program a lighting schedule at the lighting apparatus 110 for managing activation/deactivation or settings of the light source 112 over a period of time, such as a day, a week, or a month, among other possibilities. The lighting apparatus 110 may, for example, be implemented as a smart light bulb. The electronic device 140 may, for example, be implemented as a mobile computer, a smart phone, a laptop computer, or a desktop computer or the like, among other possibilities.

The lighting apparatus 110 can include a light source 112, a communication circuit 114, a controller 116, a memory device 118, a driver circuit 120, an input port 122, and a housing 124.

The light source 112 can generate light via incandescence, luminescence, combustion, electric arcing, or gas discharge, among other possibilities. The light source 112 can, for instance, include one or more of a light emitting diode (LED), a filament, or a gas, or one or more thereof, among other possibilities. The light source 112 can emit visible light (for example, which can include electromagnetic radiation that has a wavelength between 380 nm to 700 nm) so that the visible light is usable to light an area for viewing by an individual. The light source 112 may or may not emit electromagnetic radiation other than visible light. In one implementation, the light source 112 can include multiple LEDs, such as a total of 2, 3, 4, 5, 8, 10, 12, 15, 20, 25, or 50 or more LEDs. The multiple LEDs can direct light in multiple different directions or in a common direction. The light source 112 can be powered by mains power or a battery that may be received through the input port.

The communication circuit 114 can wirelessly communicate with one or more devices, such as the electronic device 140. The communication circuit 114 can include one or more antennas (not shown). The communication circuit 114 can wirelessly communicate according to a packet-based protocol (for example, a Bluetooth™ protocol), a network protocol (for example, a Wi-Fi™ protocol), or another protocol. The communication circuit 114 can, in one implementation, wirelessly communicate via electromagnetic radiation that has a frequency of more than 2 GHz and less than 10 GHz. In another implementation, the communication circuit 114 can wirelessly communicate via electromagnetic radiation that has any usable frequency including less than 2 GHz and more than 10 GHz. Additionally or alternatively, the communication circuit 114 can wirelessly communicate using other approaches, such as via visible light communication (for example, according to a LiFi protocol) by activating and deactivating the light source 112 or another light source (not shown) of the lighting apparatus 110 to transmit data or by detecting light with a photodetector (not shown) to receive data.

The communication circuit 114 can be in one of multiple modes including a first mode in which wireless communication by the communication circuit 114 is enabled and a second mode in which wireless communication by the communication circuit is disabled. The wireless communication can be enabled by placing the communication circuit 114 in an awake state or activating the communication circuit 114. The wireless communication can be disabled by placing the communication circuit 114 in a sleep state or deactivating the communication circuit 114. The communication circuit 114 may be able to send or receive wireless communications when in the first mode and unable to send or receive wireless communications when in the second mode.

The controller 116 can control operations of the lighting apparatus 110 according to executable instructions stored to the memory device 118. The executable instructions may be stored at manufacture or may be updated or stored prior to use or after installation, such as via one or more messages wirelessly received from the electronic device 140 via the communication circuit 114.

The controller 116 can activate and deactivate the light source 112. The controller 116 can control activation and deactivation of the light source 112 responsive to a power signal received via the input port 122 that may vary according to user inputs to the user input element 130. The power signal can provide power to the lighting apparatus 110, including the light source 112, the communication circuit 114, and the controller 116. The power signal may supply power to the lighting apparatus 110 when at a first level (for example, a non-zero voltage) but may not supply power to the lighting apparatus 110 when at a second level (for example, a zero voltage) different from the first level. In one implementation, the controller 116 can activate the light source 112 when the power signal transitions from the second level to the first level, and can deactivate the light source 112 when the power signal is at the second level or transitions from the first level to the second level.

The controller 116 can control, responsive to the power signal, whether the communication circuit 114 is in the first mode or the second mode. The controller 116 can cause the wireless communication by the communication circuit 114 to be enabled by placing the communication circuit 114 into an awake state (for example, by transmitting an awake instruction to the communication circuit 114) or activating the communication circuit 114 (for example, by transmitting an activate instruction to the communication circuit 114 or by connecting power to the communication circuit 114). The controller 116 can cause the wireless communication by the communication circuit 114 to be disabled by placing the communication circuit 114 into a sleep state (for example, by transmitting a sleep instruction to the communication circuit 114) or deactivating the communication circuit 114 (for example, by transmitting a deactivate instruction to the communication circuit 114 or by disconnecting power to the communication circuit 114).

The controller 116 can detect a set change in the power signal over a period of time when the communication circuit 114 is in the second mode. The set change in the power signal can include the power signal changing from the first level to the second level. The controller 116 can, responsive to detecting the set change in the power signal over the period of time when the communication circuit is in the second mode, cause the communication circuit 114 to transition from being in the second mode to being in the first mode. In one implementation, the controller 116 may cause the communication circuit 114 to transition from being in the second mode to being in the first mode responsive to no events other than detecting the set change in the power signal over the period of time when the communication circuit is in the second mode.

The controller 116 can control, responsive to expiration of a timer, whether the communication circuit 114 is in the first mode or the second mode. The controller 116 can cause the communication circuit 114 to transition from being in the first mode to being in the second mode responsive to the communication circuit 114 being in the first mode for a set time period, such as 1, 2, 5, 10, 15, 20, or 30 minutes, among other possibilities, or a range of time between two of those durations. Additionally or alternatively, the controller 116 can cause the communication circuit 114 to transition from being in the first mode to being in the second mode responsive to expiration of a set time period (for example, 0.25, 0.5, 0.75, 1, 1.5, 2, 3, 5, or 10 minutes, among other possibilities, or a range of time between two of those durations) after receiving a previous communication from the electronic device 140.

The controller 116 can activate or deactivate the light source 112 to indicate detection of the set change in the power signal or that the controller 116 caused wireless communication by the communication circuit 114 to be enabled or disabled. The controller 116 can, for example, activate and deactivate the light source multiple times (for instance, 1, 2, 3, or more times) or change a color (for instance, to green to indicate enablement of wireless communication or to red to indicate disablement or wireless communication) or brightness (for instance, dim or brighten) of emitted light over a period of time (for instance, 1, 2, 3, 4, or 5 seconds or more) to indicate detection of the set change or that the controller 116 caused wireless communication to be enabled or disabled. As a result, the controller 116 can inform a user via the light source 112 whether wireless communication by the communication circuit 114 has been enabled or disabled.

The controller 116 can activate or deactivate the light source 112 or control certain settings of the light source 112 according to a lighting schedule stored to the memory device 118. The lighting schedule can indicate to activate or deactivate the light source 112 at a particular time or times or according to certain settings, and the controller 116 can activate or deactivate the light source 112 in accordance with the indications in the lighting schedule and the certain settings. For example, the lighting schedule can indicate to (i) activate the light source 112 at 2 pm with a first brightness or color of light, (ii) deactivate the light source 112 at 5 pm, (iii) activate the light source 112 every date at 8 am with a second brightness or color of light different from the first brightness or color of light, (iv) deactivate the light source 112 every day at 10 am, (v) activate the light source 112 every Monday and Wednesday at 12 noon, or (vi) deactivate the light source 112 every Thursday and Friday at 1 pm, among other possibilities.

The controller 116 can create, initiate, or update the lighting schedule according to one or more instructions wirelessly received from the electronic device 140 via the communication circuit 114. For example, the controller 116 can receive an instruction from the electronic device 140 to activate or deactivate the light source 112 at a future time, such as at a set time (for example, 11 am or 1:30 pm) or at a period of time after a current time (for example, 10 or 60 minutes later), or to change another light setting for the light source 112 (for example, a color or brightness of the light source 112) or a control setting for the controller 116 (for example, a sleep/awake state or schedule for the controller 116). As another example, the controller 116 can generate a message and transmit the message to the electronic device 140 to provide status or configuration information (for example, a current lighting schedule or a current color or brightness of the light source 112) for the lighting apparatus 110 to the electronic device 140.

The driver circuit 120 can selectively supply a current to the light source 112 under control of the controller 116. The driver circuit 120 may activate the light source 112 when the driver circuit 120 supplies current and deactivate the light source 112 when the driver circuit 120 does not supply current. The driver circuit 120 can control a color or brightness of light emitted by the light source 112. The driver circuit 120 can include an AC-DC conversion circuit to convert supplied AC power to DC (for example, to convert mains power to a DC voltage).

The input port 122 can receive the power signal, which may be powered by mains power. When the power signal may be at the first level, the input port 122 may receive power and be connected to mains power. When the power signal may be at the second level, the input port 122 may receive no power and not be connected to mains power. The power signal may be controlled by user inputs to the user input element 130. For example, when the user input element 130 may be in a first state, the power signal can be at the first level, and when the user input element 130 may be in a second state, the power signal can be at the second level. The input port 122 may receive the power signal and provide the power signal to the controller 116. The input port 122 can include a socket, such as a screw-type socket, a pin socket, a twist and lock socket, a bayonet socket, a wedge socket, or a plug-in socket, among other possibilities.

The housing 124 can support other components of the lighting apparatus 110, including the light source 112, the communication circuit 114, the controller 116, the memory device 118, the driver circuit 120, or the input port 122.

The user input element 130 can be an input switch, such as a toggle switch (for example, a light switch) or a selector switch, or other type of input element like a touchscreen or a joystick. The user input element 130 may be used by a user to (i) control powering of the lighting apparatus 110, (ii) trigger activation or deactivation of the light source 112, or (iii) trigger a transition of the communication circuit 114 from the second mode to the first mode so that wireless communication by the communication circuit 114 is enabled. The user input element 130 may control transmission of the power signal to the lighting apparatus 110 so that the controller 116 can receive and process the power signal regardless of whether the communication circuit 114 is in the first mode or the second mode. The lighting apparatus 110 may, for example, receive the power signal via wired communication so that the controller 116 can receive and process the power signal even if wireless communication by the communication circuit 114 is disabled.

The electronic device 140 can include a processor 142, a memory device 144, a communication circuit 146, a user interface 148, a power source 150, and a housing 152.

The processor 142 can control operations of the electronic device 140 according to executable instructions, such as one or more programs, stored to the memory device 144. The executable instructions may be stored at manufacture or may be later stored, such as upon receipt via one or more messages received by the electronic device 140 through wired or wireless communication by the communication circuit 146. The one or more programs can, for example, be one or more applications downloadable through a mobile application store on a smart phone.

The electronic device 140 can wirelessly communicate with the communication circuit 114 of the lighting apparatus 110 via the communication circuit 146. The communication circuit 146 can wirelessly communicate according to a packet-based protocol (for example, a Bluetooth™ protocol) or a network protocol (for example, a Wi-Fi™ protocol). The communication circuit 146 can, in one implementation, wirelessly communicate via electromagnetic radiation that has a frequency of more than 2 GHz and less than 10 GHz. In another implementation, the communication circuit 114 can wirelessly communicate via electromagnetic radiation that has any usable frequency including less than 2 GHz and more than 10 GHz. Additionally or alternatively, the communication circuit 146 can wirelessly communicate using other approaches, such as via visible light communication by activating and deactivating a light source (not shown) of the electronic device 140 to transmit data or detecting variation in light with a detector to receive data.

The electronic device 140 can communicate with the lighting apparatus 110 by sending or receiving one or more messages. The one or more messages can, for example, be sent by the electronic device 140 to the lighting apparatus 110 to provide one or more instructions to the controller 116 to activate or deactivate the light source 112 at a future time, such as at a set time (for example, 11 am or 1:30 pm) or at a period of time after a current time (for example, 10 or 60 minutes later), or to change another light setting for the light source 112 (for example, a color or brightness of the light source 112) or a control setting for the controller 116 (for example, a sleep/awake state or schedule for the controller 116). The electronic device 140 may accordingly allow a user to control operating characteristics of the lighting apparatus 110, such as a lighting schedule for the light source 112. The one or more messages can, for example, be received by the electronic device 140 from the lighting apparatus 110 to provide status or configuration information (for example, a current lighting schedule or a current color or brightness of the light source 112) for the lighting apparatus 110 to the electronic device 140.

The user interface 148 can provide an interface through which a user may control operations or understand a status or configuration of the lighting apparatus 110. The user may navigate through one or more menus in a program to select and transmit one or more messages (such as an instruction) to the lighting apparatus 110 via the communication circuit 146. The controller 116 of the lighting apparatus 110 may receive or process the one or more messages and adjust operations in accordance with one or more indications in the one or more messages. Moreover, the user can navigate through the one or more menus to select and view information received from the lighting apparatus 110 via one or more messages. The user interface 148 can include a touchscreen with a graphical user interface presented thereon or a remote control with buttons and indicator lights configured to facilitate communication with the lighting apparatus 110, among other possibilities.

The power source 150 can supply power to other components of the electronic device 140, such as the processor 142, the memory device 144, the communication circuit 146, the user interface 148. The power source 150 can be a battery or connected to mains power.

The housing 152 can support other components of the electronic device 140, such as the processor 142, the memory device 144, the communication circuit 146, the user interface 148, and the power source 150.

Figure 2:
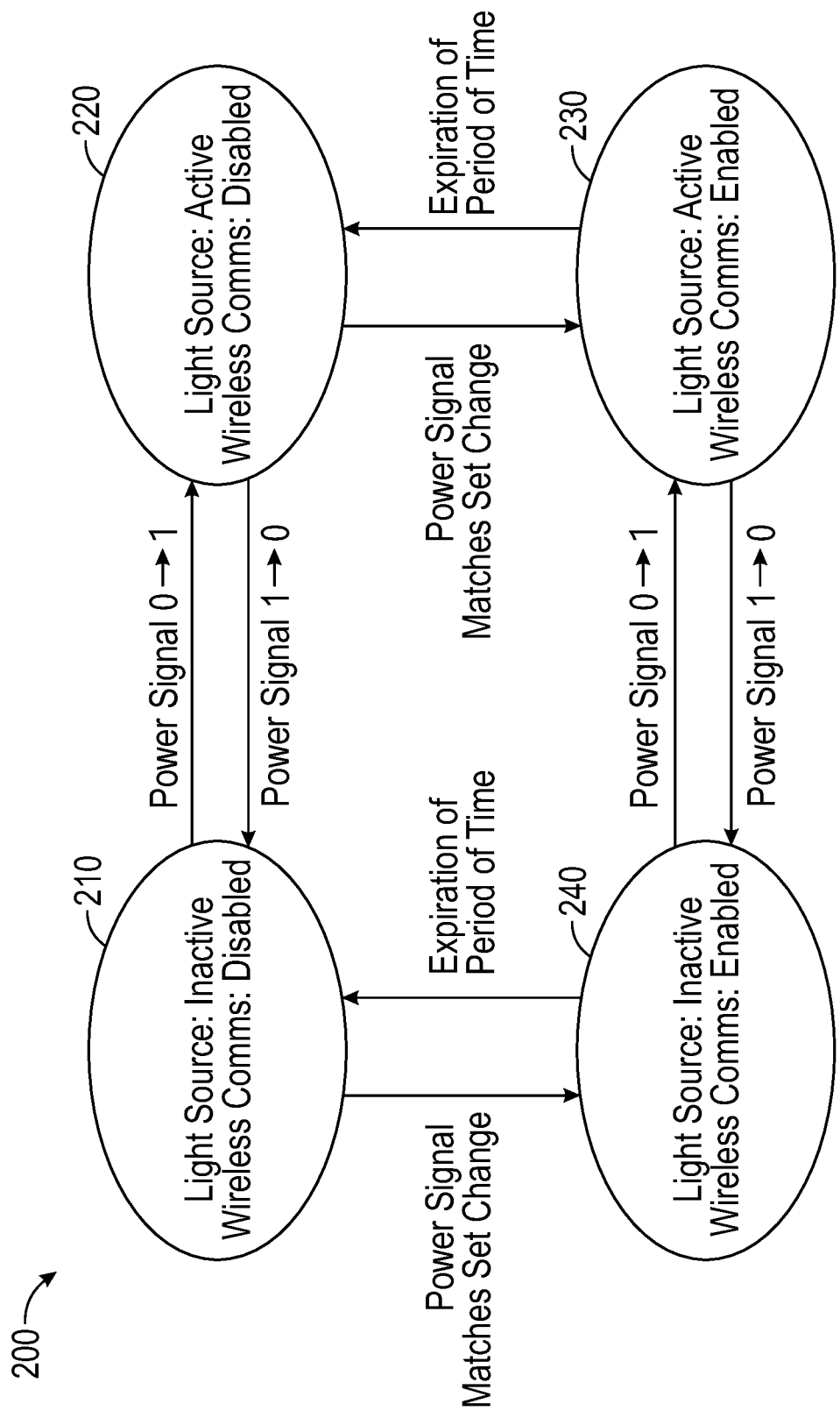
FIG. 2 illustrates a state diagram for controlling a mode of a lighting apparatus, such as the lighting apparatus of FIG. 1.

FIG. 2 illustrates a state diagram 200 for controlling a mode of a lighting apparatus, such as the lighting apparatus 110 of FIG. 1. As illustrated, the state diagram 200 can include four states. Each of the four states can correspond to whether a light source (such as the light source 112) is active or whether wireless communications (such as wireless communications by the communication circuit 114 of the lighting apparatus 110) are enabled.

The state diagram 200 can include a first state 210 where the light source is inactive and the wireless communications are disabled. The state diagram 200 can include a second state 220 where the light source is active and the wireless communications are disabled. The state diagram 200 can include a third state 230 where the light source is active and the wireless communications are enabled. The state diagram 200 can include a fourth state 240 where the light source is inactive and the wireless communications are enabled. Transitions in the state diagram 200 may occur responsive to a power signal (such as the power signal of FIG. 1) or expiration of a period of time, among other possibilities.

The lighting apparatus functioning according to the state diagram 200 can, responsive to a change in the power signal from a zero level (for example, a zero value or a zero voltage) to a one level (for example, a non-zero value or a non-zero voltage), transition from the first state 210 to the second state 220 or transition from the fourth state 240 to the third state 230. The lighting apparatus functioning according to the state diagram 200 can, responsive to a change in the power signal from the one level to the zero level, transition from the second state 220 to the first state 210 or transition from the third state 230 to the fourth state 240.

The lighting apparatus functioning according to the state diagram 200 can, responsive to a change in the power signal over a period of time matching a set change, transition from the first state 210 to the fourth state 240 or transition from the second state 220 to the third state 230. The period of time can be 2, 3, 5, 7, 10, 15, 20, or 30 seconds, or a range of time between two of those periods or less than 2 seconds or greater than 30 seconds. In one implementation, the set change can include the power signal changing from the one level to the zero level. In yet another implementation, the set change can include the power signal changing n times (i) from the one level to the zero level and back to the one level or (ii) from the zero level to the one level and back to the zero level, where n may be an integer and equal to one or more (for example, equal to 1, 2, 3, 4, 5, 6, 7, 8, 9, or 10 or more). In yet a further implementation, the set change can include the power signal changing (i) from the one level to the zero level and back to the one level and then back to the zero level or (ii) from the zero level to the one level and back to the zero level and then back to the one level.

The lighting apparatus functioning according to the state diagram 200 can, responsive to expiration of a period of time, transition from the fourth state 240 to the first state 210 or transition from the third state 230 to the second state 220. The expiration of the period of time can be relative to when the lighting apparatus (i) last transitioned to the third state 230 or the fourth state 240 or (ii) received a previous communication from another device (for example, a previous message from the electronic device 140. The expiration of the period of time can be determined to occur when a set time passes or a value of timer satisfies a time threshold. The period of time can expire upon passing of 10 seconds, 15 seconds, 20 seconds, 30 seconds, 45 seconds, 60 seconds, 1.5 minutes, 2 minutes, 3 minutes, 5 minutes, 10 minutes, 15 minutes, 30 minutes, or a range of time between two of those periods or less than 10 seconds or greater than 30 minutes.

Although a particular state transition in the state diagram 200 may be described as occurring responsive to the power signal, the particular state transition may occur additionally or alternatively responsive to expiration of a period of time. Although a certain state transition in the state diagram 200 may be described as occurring responsive to expiration of a period of time, the certain state transition may occur additionally or alternatively responsive to the control signal.

Figure 3:
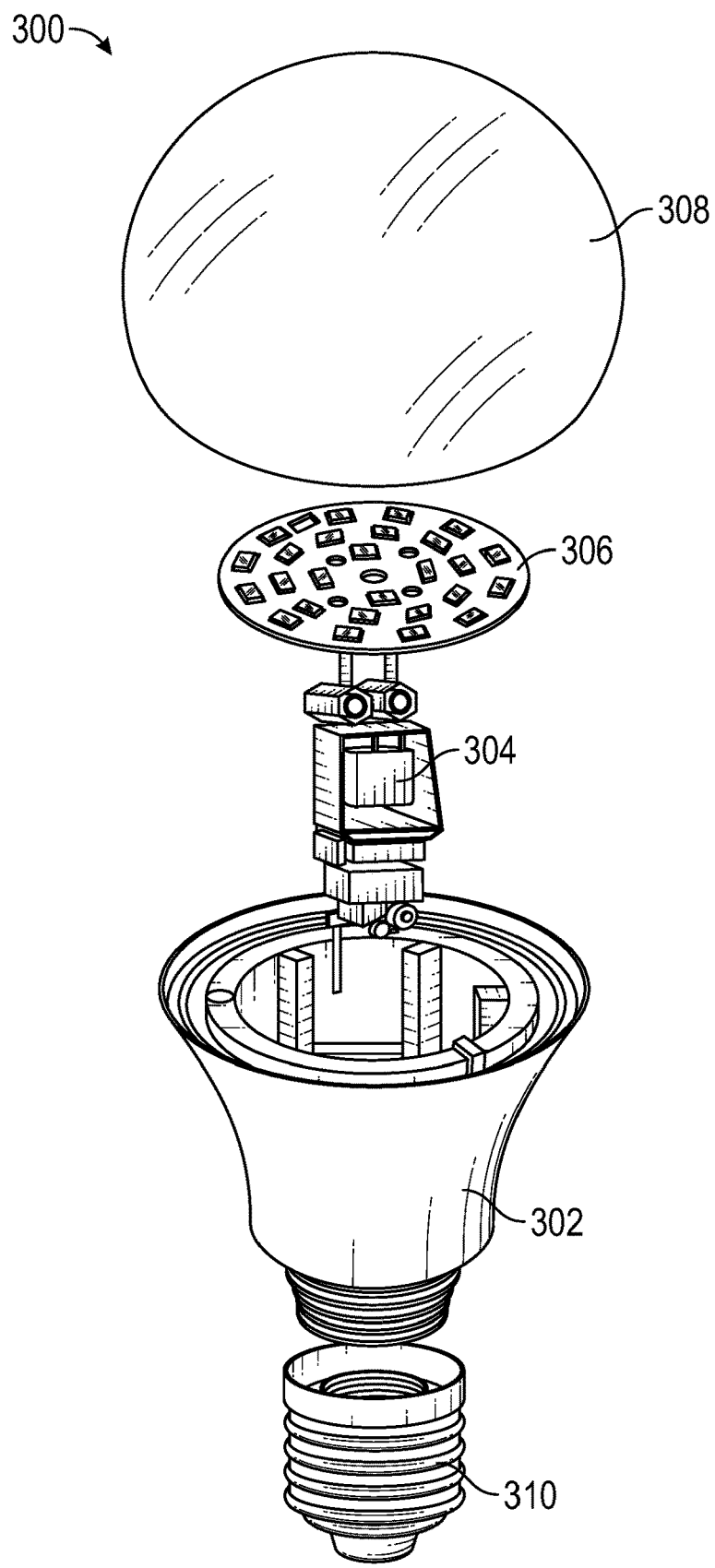
FIG. 3 illustrates a lighting apparatus, such as the lighting apparatus of FIG. 1.

FIG. 3 illustrates a lighting device 300, which can be an implementation of the lighting apparatus 110 of FIG. 1 and function according to the state diagram 200 of FIG. 2. The lighting device 300 can include a housing 302, a control circuit 304, a light chip 306, a cover 308, and a screw-type socket 310.

The housing 302 can be an implementation of the housing 124 of FIG. 1. The housing 302 can support the control circuit 304, the light chip 306, the cover 308, and the screw-type socket 310. The housing 302 can include or support a heat conductive element (not shown), such as a heat sink or fan, to facilitate cooling of other components of the lighting device 300.

The control circuit 304 can be an implementation of the communication circuit 114, the controller 116, the memory device 118, and the driver circuit 120 of FIG. 1. The light chip 306 can be an implementation of the light source 112 of FIG. 1.

The cover 308 can protect the light chip 306 and the control circuit 304 from an environment outside the lighting device 300. The cover 308 can be glass or plastic and may serve to diffuse light emitted by the LEDs mounted on the light chip 306.

The screw-type socket 310 can be an implementation of the input port 122 of FIG. 1. The screw-type socket 310 may receive a power signal, which can power components of the lighting device 300, such as the control circuit 304 and the light chip 306.

Although one or more features of this disclosure may be described in the context of a lighting apparatus, the one or more features can apply to other electronic devices that communicate wirelessly and whose activation may be cycled on-off by a user. For example, the one or more features can apply to a remote control. If a controller of the remote control detects one or more toggles of activation of the remote control by a user, the controller of the remote control can selectively enable or disable wireless communications by a communication circuit of the remote control. As another example, the one or more features can apply to a smart plug (sometimes referred to as a smart outlet). If a controller of the smart plug detects one or more toggles of power to the smart plug over a period of time, the controller of the smart plug can selectively enable or disable wireless communications by a communication circuit of the smart plug.

Conditional language, such as "can," "could," "might," or "may," unless specifically stated otherwise, or otherwise understood within the context as used, is generally intended to convey that certain embodiments include, while other embodiments do not include, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

Those who are skilled in the art will conceive of other variations and embodiments which fall within the scope of the present disclosure. Therefore, the invention is not to be limited by the above disclosure but is to be determined in scope by the claims which follow.

What is claimed is:

1. A lighting apparatus comprising:
    an input port configured to receive a power signal that supplies power when the power signal is at a first level and does not supply power when the power signal is at a second level different from the first level;
    a light source configured to emit visible light and be powered by the power signal when the power signal is at the first level;
    a communication circuit configured to:
      wirelessly communicate with an electronic device, and
      be in a first mode in which wireless communication by the communication circuit is enabled and a second mode in which wireless communication by the communication circuit is disabled;
    a controller configured to:
      activate the light source,
      deactivate the light source,
      detect a set change in the power signal over a period of time when the communication circuit is in the second mode, the set change in the power signal comprising the power signal changing from being at the first level to being at the second level, and
      responsive to detecting the set change in the power signal over the period of time when the communication circuit is in the second mode, cause the communication circuit to transition from being in the second mode to being in the first mode; and
    a housing configured to support the input port, the light source, the communication circuit, and the controller.

2. The lighting apparatus of claim 1, wherein the set change in the power signal comprises the power signal changing n times (i) from being at the first level to being at the second level and back to being at the first level or (ii) from being at the second level to being at the first level and back to being at the second level, n being two or more.

3. The lighting apparatus of claim 2, wherein the period of time is 10 seconds or less.

4. The lighting apparatus of claim 2, wherein n is five.

5. The lighting apparatus of claim 1, wherein the input port comprises a screw-type socket.

6. The lighting apparatus of claim 1, wherein the communication circuit and the controller are configured to be powered by the power signal when the power signal is at the first level.

7. The lighting apparatus of claim 1, wherein
    the communication circuit is configured to wirelessly receive an instruction from the electronic device, the instruction indicating to activate or deactivate the light source at a future time, and
    the controller is configured to activate or deactivate the light source at the future time according to the instruction.

8. The lighting apparatus of claim 7, wherein the future time is at least 1 minute later than a time when the communication circuit receives the instruction from the electronic device.

9. The lighting apparatus of claim 7, in combination with the electronic device, the electronic device being configured to execute a program to allow a user to wirelessly communicate the instruction from the electronic device to the communication circuit.

10. The lighting apparatus of claim 1, wherein the communication circuit is configured to wirelessly communicate with the electronic device according to a packet-based protocol or a network protocol.

11. The lighting apparatus of claim 1, wherein the communication circuit is configured to wirelessly communicate with the electronic device via electromagnetic radiation that has a frequency of more than 2 GHz and less than 10 GHz.

12. The lighting apparatus of claim 1, wherein the controller is configured to cause the communication circuit to transition from being in the second mode to being in the first mode responsive to no events other than detecting the set change in the power signal over the period of time when the communication circuit is in the second mode.

13. The lighting apparatus of claim 1, wherein the controller is configured to cause the communication circuit to transition from being in the first mode to being in the second mode responsive to the communication circuit being in the first mode for a set time period.

14. The lighting apparatus of claim 1, wherein the controller is configured to cause the communication circuit to transition from being in the first mode to being in the second mode responsive to expiration of a set time period after receiving a previous communication from the electronic device.

15. The lighting apparatus of claim 14, wherein the set time period is between 10 seconds and 2 minutes.

16. The lighting apparatus of claim 1, wherein the controller is configured to, responsive to detecting the set change in the power signal over the period of time when the communication circuit is in the second mode, change a property of the visible light emitted by the light source for less than a set time period to indicate that the communication circuit transitioned from being in the second mode to being in the first mode, the set time period being 5 seconds.

17. The lighting apparatus of claim 1, wherein the controller is configured to:
    detect that the power signal changed from being at the second level to being at the first level, and
    responsive to detecting that the power signal changed from being at the second level to being at the first level, activate the light source.

18. The lighting apparatus of claim 1, wherein the light source comprises a plurality of light emitting diodes.

19. The lighting apparatus of claim 18, further comprising a driver circuit configured to supply a current to the plurality of light emitting diodes, the controller being configured to cause the driver circuit to supply the current to activate the plurality of light emitting diodes and cause the driver circuit to not supply the current to deactivate the plurality of light emitting diodes.

20. The lighting apparatus of claim 1, in combination with a user input element configured to switch the power signal (i) from being at the first level to being at the second level responsive to a first user input to the user input element and (ii) from being at the second level to being at the first level responsive to a second user input to the user input element.

\* \* \* \* \*